United States Patent [19]

Gajajiva et al.

[11] 4,393,900

[45] Jul. 19, 1983

[54] INSERT PLUG

[75] Inventors: Padej Gajajiva, Fairfield; Eigil Wium, Cheshire, both of Conn.

[73] Assignee: General Signal Corporation, Stamford, Conn.

[21] Appl. No.: 325,075

[22] Filed: Nov. 25, 1981

[51] Int. Cl.³ .............................................. F16L 55/24
[52] U.S. Cl. .................................................... 138/89
[58] Field of Search ................. 52/244; 138/89, 96 T; 215/296, 302; 220/284, 288; 411/410

[56] References Cited

U.S. PATENT DOCUMENTS

| 506,531 | 10/1893 | McManus et al. | 220/288 X |
| 712,094 | 10/1902 | Raymond | 215/302 X |
| 1,148,545 | 8/1915 | Serry | 220/288 X |
| 1,446,361 | 2/1923 | Van Leer | 220/288 |
| 1,569,875 | 1/1926 | Nixon | 138/89 X |
| 1,806,932 | 5/1931 | Burnish | 138/96 T |
| 3,195,762 | 7/1965 | Senoff | 220/284 |

FOREIGN PATENT DOCUMENTS 21718 of 1894 United Kingdom ................... 138/89

Primary Examiner—Stephen Marcus
Assistant Examiner—Mark John Thronson
Attorney, Agent, or Firm—George W. Killian

[57] ABSTRACT

A threaded insert plug for at least temporarily closing an opening in an internally threaded member. The plug member comprises a right circular cylinder closed at the lower end thereof. The closing surface includes an upstanding central portion proportioned to permit the application of a wrench and may include a screwdriver slot on an upper surface. The interior of the cylinder includes critically positioned projections and/or depressions which permits use of a lever having an end positioned against the projection or depression and a mid-portion against at least part of the upstanding central portion to permit the production of a turning torque. The surface irregularities may be configured and positioned to permit engagement with a suitable wrench. The walls of the plug may have generally uniform thickness thereby providing an economical and minimum weight plug. The upper surface of the upstanding central portion rises no further than the plane including the upper limit of the plug member. This facilitates use of the plug with a coupling to provide a penetration in a poured concrete wall or any other application where flush mounting is expedient.

14 Claims, 6 Drawing Figures

INSERT PLUG

BACKGROUND OF THE INVENTION

In systems which employ various types of pipe or conduit, it is sometimes necessary to provide either a temporary or permanent closure such pipe or conduit might otherwise be connected, and/or to close openings in fittings or enclosures. Closure means may employ threaded caps or plugs, non-threaded friction fit caps or plugs, soldering, brazing, or welding techniques, and others with which those acquainted with the related arts are familiar. Considering specifically threaded plugs, it will be apparent that some means must be provided for rotating the plug. This may comprise a screwdriver slot, an indented square, or other shape for engagement with a wrench, or an upstanding member such as a square or other shape which may be grasped and turned by means of a suitable tool. Each technique has advantages and disadvantages, depending upon the particular application and size. In commercial wiring, it is frequently necesary to have conduit pass through a concrete barrier such as a foundation or other wall. For convenience, economy and efficiency, it has become standard practice in the art to provide the penetration through the concrete wall by securing a threaded coupling of appropriated length and diameter and supporting the same between the forms which provide the boundary for the poured concrete wall. Unfortunately, it is not always practical to secure a good seal between the coupling and the form comprising a boundary of the concrete wall and therefore, it would be usual for concrete to reach and fill the interior of the coupling. Accordingly, it would be necessary to remove the concrete from the interior of the coupling. It has long been standard practice to prevent entrance of concrete into the coupling by providing a plug at each end thereof. Subsequent to pouring of the wall and removal of the forms, the plugs are removed and appropriate connections made with threaded conduit. It will be immediately apparent that plugs having projecting members for attaching a wrench would not be satisfactory for use in this application because the projecting member would be surrounded with concrete after the wall is poured and it would be necessary to chip away considerable concrete in order to facilitate gaining access to the plug and removal thereof. It might be considered that this difficulty could be overcome by using a coupling of exactly the right length to reach between the forms providing the wall boundary and inserting the plug into the coupling sufficiently far that no part of the plug extends beyond the longitudinal limit of the coupling. However, because a tight fit between the coupling and the concrete form cannot be assured, concrete is almost sure to enter into the void within the coupling and surrounding the upstanding part to which a wrench may be attached. Such concrete will lay in the coupling threads and cause considerable difficulty as an attempt is made to remove the plug and/or to connect threaded conduit. Accordingly, for the application cited, it is customary to use a plug whose upper surface is essentially planar except for an indentation to accomodate a screwdriver, wrench or other turning device. However, there is still a high probability that concrete may enter the indentation making it difficult to use the screwdriver or wrench to turn and remove the plug.

The structure of the present invention has the advantages of the prior art and eliminates, or at least minimizes the difficulties encountered in using prior art devices.

Prior art devices are ubiquitous and may be observed in a wide type of applications and environments. The most typical and ubiquitous prior art devices are illustrated herein in FIGS. 4A, 4B and 4C.

It is an object of the invention to provide a new, improved and economical threaded plug.

It is a more specific object of the invention to provide a threaded plug which has no portion thereof extending above the plane including the upper limit of the threaded body member.

It is another object of the invention to provide a plug of the character described which may be turned by a wide variety of turning tools.

It is another object of the invention to provide a plug of the character described which provides a plurality of means for applying a turning torque.

It is another object of the invention to provide a plug of the character described which can be turned in response to the application of a torque by a lever member.

It is another object of the invention to provide a plug of the character described which provides appropriately positioned and configured surfaces for engagement with and/or by a variety of tools.

It is another object of the invention to provide a plug of the character described which can be readily rotated irrespective of the presence of foreign matter adhering to various portions of the plug.

It is another object of the invention to provide a plug of the character described which can be turned by means of a lever engaged with two appropriately configured and positioned surfaces thereof.

Still another object of the present invention is to provide a new and improved plug for use in the selected applications which substantially overcomes the disadvantages of the described prior art constructions, and which provides a structure characterized by its reliability, ruggedness, ease and convenience of use, simplicity and low cost together with high versitility and adaptability.

SUMMARY OF THE INVENTION

The plug of the present invention comprises a right circular cylinder threaded on its exterior surface and includes means within the interior of the right circular cylinder and between the upper and lower limits thereof, for using tools to exert a turning torque on the plug. It is an important feature of the structure that no portion thereof extends beyond the plane including the upper limit of the right circular cylinder. The turning means may include an upstanding projection within the interior of the plug which may have an appropriate shape for engagement with a mating wrench or other tool. In addition, the upstanding member may include a recess, such as a screwdriver slot, for engagement with an alternative turning tool. The interior surface of the right circular cylinder includes one or more surface portions which are configured in a manner to facilitate engagement of one end of a lever therewith while a central portion of the lever engages at least part of the upstanding member. The surfaces on the interior surface of the right circular cylinder may also be positioned and configured to facilitate the use of a mating wrench or other tool therewith. It will be apparent that the plug may be rotated by means of a lever, as above-described, irrespective of the fact that foreign matter, such as concrete, may be adhering to various parts of the plug.

BRIEF DESCRIPTION OF THE DRAWING

To permit an incisive and detailed analysis of the characteristics and operational features of this invention, various figures thereof are provided. The drawing discloses a specific form of the invention and is not meant in any way to delimit its scope, it is rather so drawn as an aid in understanding the inventive concept. As is customary, like elements are given identical item numbers in all views.

DESCRIPTION OF THE PREFERRED EMBODIMENT

Figure 1:
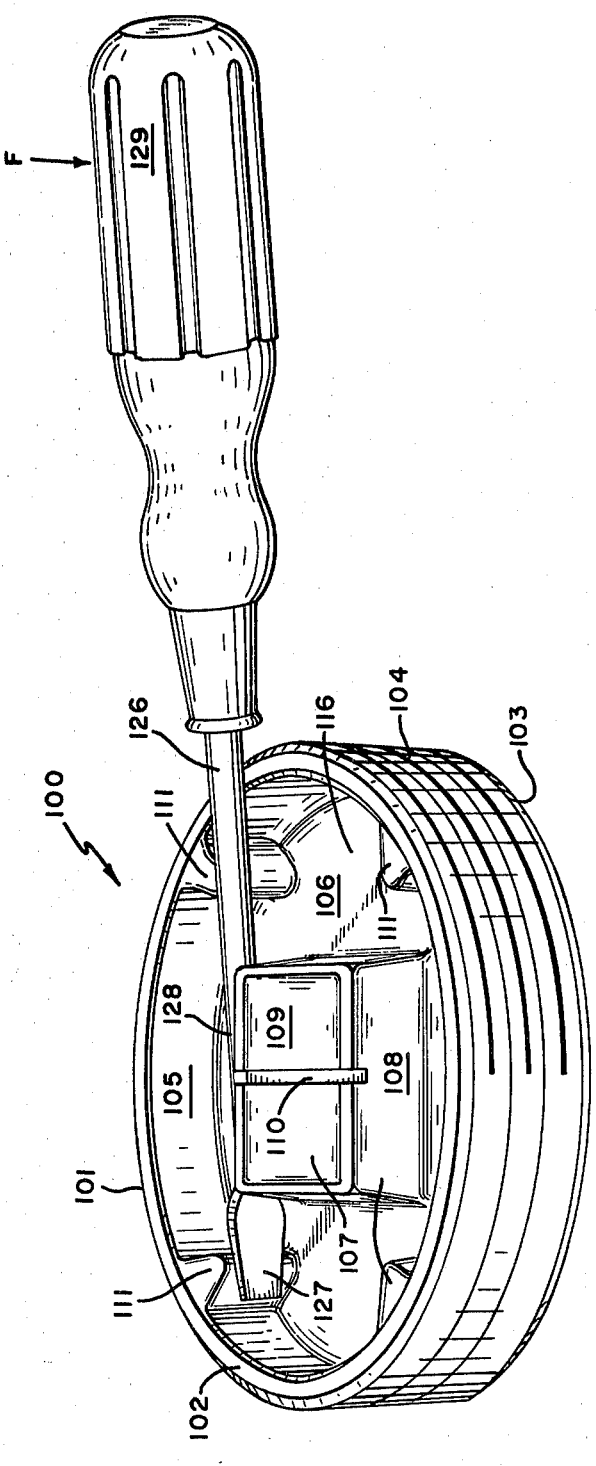
FIG. 1 comprises an isometric view of a structure together with an illustration of one means for applying a turning torque.

Considering first FIG. 1, there will be seen therein, as a principle element thereof, a plug designated generally as 100. A principle member of the plug 100 comprises the outer cylindrical wall 101 which is a right circular cylinder having an upper rim 102 and a corresponding lower rim 103 which is not readily visible in FIG. 1. The outer cylindrical wall 101 includes threads 104 on the outer surface thereof. The outer cylindrical wall 101 will be seen to include an inner surface 105 which includes portions generally concentric with the threads 104. The plug 100 includes a lower surface 106, which, among other things, closes what would otherwise be an opening through the interior of the outer cylindrical wall 101. Generally, the lower surface 106 starts from the plane of the lower rim 103 and closes the opening through the center of the cylindrical wall 101. Formed on the lower surface 106 is an upstanding member 107 which has a plurality of generally planar surfaces such as 108 and a top surface 109. The top surface 109 may include a screwdriver slot 110 or a depression of some other suitable configuration for mating with a different type of screwdriver or specialized wrench for insertion in the depression 110.

Formed around the inner surface 105 will be seen a plurality of inwardly projecting members 111 which will serve a purpose to be described more fully hereinafter.

The threads 104 of the plug 100 may or may not be tapered depending upon the intended application of the plug 100. In like manner, the height of the cylindrical wall 101 between the upper and lower rims 102 and 103 will be determined by the intended application of the plug and/or other considerations relating to economy and manufacturing costs, etc. That is, the various dimensions of the plug 100 are not of the essence.

Figure 2:
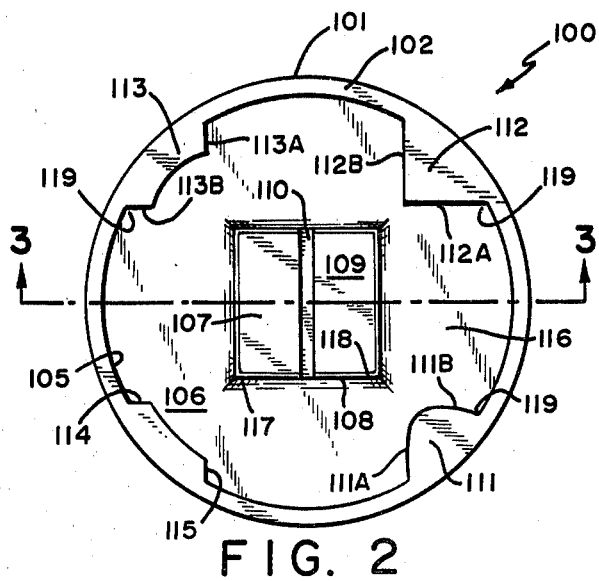
FIG. 2 comprises a top view of the structure of FIG. 1 albeit with minor modifications.

FIG. 2 will be seen to comprise a top view of the plug 100 as seen in FIG. 1, albeit with minor modifications. More specifically, FIG. 2 illustrates an inwardly projecting member 111 which corresponds with similar members shown in FIG. 1. However, FIG. 2 also illustrates inwardly projecting members 112 and 113 which differ in form and/or proportion one from the other. In addition, FIG. 2 illustrates another alternate form of the inwardly projecting member 111 as shown in FIG. 1 and which is illustrated as surfaces 114 and 115 in FIG. 2.

Examination of each of the inwardly projecting members 111, 112 and 113 will show that they each have two surfaces which are identified by the numbers for the inwardly projecting members followed by either an A or B and which will serve a function to be described more fully hereinbelow.

Figure 3:
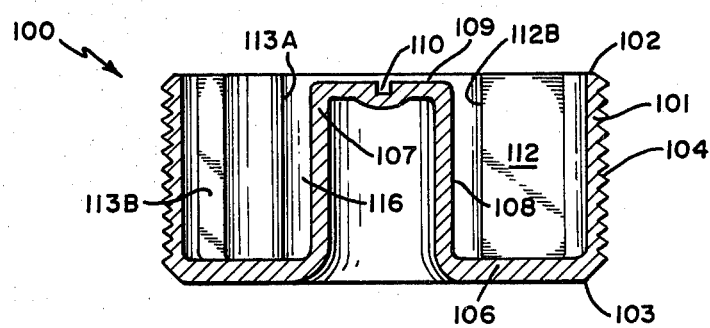
FIG. 3 comprises a cross section of the structure taken along the line 3—3 of FIG. 2.

Considering now more specifically FIG. 3, it will be seen that the top surface 109 of the upstanding member 107 rises no further than the plane including the upper rim 102. The function of this relationship, if not already perceived, will be described more fully hereinbelow. Also as illustrated in FIG. 3, the plug 100 may be most economically and expeditiously fabricated if the walls and surfaces of the plug 100 comprise members of approximately uniform thickness. This will help to minimize weight and improve effective castability of the plug 100. However, it should be understood that the thickness of the various walls of the plug 100 need not be identical and the thickness could be determined, in part at least, by other design considerations including required strength.

Turning now to the function and utility of the plug 100, it will be apparent that the threads 104 of the plug 100 may be mated with the threads of another member to provide at least a temporary closure of the opening into the other member (not shown). As set forth in the section entitled "Background of the Invention", it is common practice to prepare forms and devices which will provide for penetrations through a poured concrete wall after the forms are removed. Penetrations for conduit may be provided by positioning a coupling at right angles to, and between the surfaces of, the wall forms. In order to exclude concrete from entering the interior of the coupling, a plug 100 may be used at each end. The plug 100 to be associated with the coupling is merely threaded into the coupling as may be readily visualized. To assist in turning the plug 100, a screwdriver may be inserted in the slot 110 or other appropriate tool in the alternate substitute depression. An alternate way for applying a suitable torque to couple the plug 100 with the coupling is to provide a wrench which mates with the configuration of the upstanding member 107. And as already suggested, a specialized wrench could be made which will mate with the inwardly projecting members 111. By these and/or any other convenient and expedient means, the plug 100 is positioned with the coupling and the combination suspended between the forms in readiness for the pouring of the concrete wall all in a manner which is well known in the trade. Although it is intended that the upper rim 102 and/or a rim of the coupling should contact the planar surface of the wall form, it will be evident that there is at least a probability that some concrete will enter the interior 116 of the plug 100. And any such concrete entering therein may adhere to any of the surfaces of the plug 100. Thus when the concrete wall solidifies and the orms are removed, it will not be unusual to find hardened concrete adhering to at least some of the interior surfaces of the plug 100. Such concrete adhering to the surfaces of the plug 100 could make it very difficult or nearly impossible to turn the plug by means of a screwdriver in the slot 110 or a suitable wrench engaging the upstanding member 107 or an alternate wrench for working with the inwardly projecting members 111. Thus if the plug 100 must be turned by any of the techniques heretofor described, it will be apparent that it will be necessary to chip away and/or remove the interfering concrete.

Concrete might be inhibited from adhering to the various surfaces of the plug 100 by applying suitable substances to the surfaces. However, this technique is not always 100% effective, and if used, the substance may not be properly applied and therefore, there still remains a high probability that at least some concrete will be found adhering tenaciously to some of the interior surfaces of the plug 100. Further, since a mixture of concrete includes some water, there is a high probability that some water has leaked into the threads 104 and/or the mating threads initiating some rusting action thereby requiring the application of a large torque to turn the plug 100 and remove it from the coupling. In summary, removal of the plug 100 after the hardening of the concrete wall and removal of the forms could be a tedious and frustrating experience were it not for the features now to be described.

As may be readily perceived from the view of FIG. 1, the upstanding member 107 and the inwardly projecting members 111 are configured and are interrelated such that a linear screwdriver, or lever, such as 126 may be used with one end 127 in contact with one of these surfaces 111A, 111B, 112A, 112B, 113A, 113B, 114 or 115 and with a central portion 128 of the lever 126 engaged with at least part of the planar surface 108 or any other surface on the upstanding member 107 so that when a force is applied to the end 129 of the lever 126 a turning torque is applied to the plug 100. If the plug 100 has threads such that rotation of the plug in a clockwise direction, when viewed from the upper rim 102, causes the plug 100 to enter the connector, it will be seen that the lever 126 may have its end 127 engage any of the surfaces 115, 113B, 112B or 111B and with the midpoint 128 engaging one of the surfaces 108 a force can be applied by the lever 126 to turn the plug into the coupling. Conversely, with the lever 126 positioned so that its end 127 contacts one of these surfaces 111A, 112A, 113A or 114, a torque may be applied to turn the plug 100 in a counterclockwise direction to remove it from the coupling.

It will be readily perceived that turning of the plug 100 by means of the lever 126 permits the application of relatively large torques and that the fact that some bits and pieces of concrete may be adhering to various plug surfaces will not materially interfere with the use of the lever 126 in turning the plug 100. Should the interior 116 be completely filled with concrete when the forms are removed from the concrete wall, it will not be necessary to remove all such concrete in order to turn the plug 100. Rather, all that is necessary is to chip away chunks of the concrete so that the lever 126 may be applied as illustrated and irrespective of other pieces of concrete adhering to various portions of the plug 100. An alternate turning technique is described below.

It should be observed that the plug 100 is preferably designed such that there is a relationship between the surfaces 108, 111B and 114 such that the surfaces 111B and 114 are generally in the same plane and slightly removed from but substantially parallel to the plane of the surface 108. Similar relationships preferably exist between other corresponding surfaces. When the appropriate relationship is provided, a lever 126 may be employed such that its central portion 128 will engage the surface 108. Obviously, this ideal relationship will depend upon the thickness of the lever 126. If a lever is applied to the configuration of FIG. 2 with the end 127 of the lever engaging the surface 114 and the central portion 128 of the lever engaging the surface 108 of the upstanding member 107 and the thickness of the lever is such that the central portion does not engage the full width of the surface 108 it can be readily visualized that a thick lever will tend to engage first with the corner 117 while a thinner lever would engage first with a corner 118.

It will also be apparent that the inwardly projecting members 111 provide drive points, a few of which are illustrated as 119, against which the end of a driving tool such as a lever 126 may be engaged. With the driving tool positioned so that its longitudinal axis lies in a plane which is approximately parallel to a plane tangent to the right circular cylindrical wall 101 near the point 119 and which, within the physical limitations of the configuration of the plug 100, lies in a plane approximately parallel to the plane including the upper rim 102 a turning force may be applied to the plug 100 by striking the end of the lever remote from the end engaging the drive point 119. Or the number 111-114 could be struck directly with a hammer.

Figure 4A:
FIGS. 4A through 4C illustrate ubiquitous prior art structures.
Figure 4B:
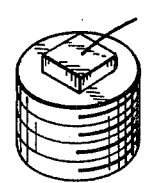
Figure 4C:
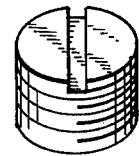

Considering now the prior art structures shown in FIGS. 4A, 4B and 4C, it will be evident that these plugs cannot be as conveniently and expeditiously utilized in the described setting because they cannot be removed from the coupling after the concrete wall is poured until all the adhering concrete is removed therefrom. This may not be strictly true with respect to the configuration of FIG. 4B inasmuchas it might be turned by a pipe wrench irrespective of the fact that some concrete might be adhering to the upward projecting plug. However, the plug of FIG. 4B would not be considered as acceptable for use in the described application because if the surface 401 is in contact with the surface of the concrete form and no threads of the coupling are exposed, it will be necessary to chip considerable concrete from the wall in order to gain access to the coupling. This would provide a rough and unfinished appearing penetration through the wall and one which is expensive because of the necessity to chip away concrete. If the plug of FIG. 4B is inserted such that the lip of the associated coupling contacts the wall form, it will mean that any concrete which manages to get between the coupling lip and the form will solidify on the threads of the coupling and again cause considerable inconvenience and aggravation. It is for these reasons that the plugs of FIGS. 4A and 4C were more commonly used in application of the character described prior to the advent of the structure shown in FIGS. 1 through 3.

While there has been shown and described what is considered at present to be a preferred embodiment of the invention, modifications thereto will readily occur to those skilled in the related arts. For example, in another structure, the upstanding member 107 could comprise merely a bearing post and not be configured for the application of a wrench. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiment shown and described, and it is intended to cover in the appended claims all such modifications as fall within the true spirit and scope of the invention.

What is claimed is:

1. A plug for use with a mating body member and comprising in combination:

(a) a generally cylindrical plug member threaded on its outer cylindrical surface;
(b) a closing surface member for closing said plug member at the lower limit thereof;
(c) said closing surface member including a central upward projecting member; and wherein
(d) said cylindrical plug member includes an inner surface having a first longitudinal surface projecting inward and disposed on said inner surface in a manner to permit a linear lever to be positioned for an end thereof to contact said first longitudinal surface concurrently with an intermediate portion of said lever contacting said upward projecting member whereby a turning torque may be exerted on said plug in response to the application of force on the linear lever.

2. The combination as set forth in claim 1 wherein said turning torque may be either a clockwise or counterclockwise torque.

3. The combination as set forth in claim 2 wherein said central upward projecting member has a plurality of generally planar surfaces each being in a plane approximately parallel to the longitudinal axis of said cylindrical plug.

4. The combination as set forth in claim 3 wherein said plurality of generally planar surfaces have relative orientations for permitting the application of a suitable wrench thereto for exerting a turning torque on said plug member.

5. The combination as set forth in claim 4 and including a second longitudinal surface projecting inward from said inner surface and with each of said first and second longitudinal surfaces having at least a portion thereof residing in a plane generally parallel to, but slightly displaced from, the plane of one or another of said plurality of generally planar surfaces.

6. The combination as set forth in claim 5 wherein the orientation and physical relationships of said first longitudinal surface and one of said plurality of generally planar surfaces are so interrelated that a linear lever may be engaged conjointly with at least portions of said surfaces for effecting clockwise turning of said plug member and wherein the orientation and physical relationships of said second longitudinal surface and one of said plurality of generally planar surfaces are so interrelated that a linear lever may be engaged conjointly with at least portions of said surfaces for effecting counterclockwise turning of said plug member.

7. The combination as set forth in claim 6 wherein said first and second longitudinal surfaces are created by depressions into the otherwise inner cylindrical surface of said plug member.

8. The combination as set forth in claim 6 wherein said first and second longitudinal surfaces are created by projections from the otherwise inner cylindrical surface of said plug member.

9. The combination as set forth in claim 6 wherein said inner surface includes a plurality of said first and second longitudinal surfaces.

10. The combination as set forth in claim 9 wherein said plurality of first and second longitudinal surfaces have relative orientations for permitting the application of a suitable wrench thereto for exerting a turning torque on said plug member.

11. The combination as set forth in claim 1 wherein said central upward projecting member approaches but extends no further upward than the plane including the upper limit of said cylindrical plug member.

12. The combination as set forth in claim 4 wherein said central upward projecting member approaches but extends no further upward than the plane including the upper limit of said cylindrical plug member.

13. The combination as set forth in claim 12 wherein the thickness of the walls of said cylindrical plug member, said closing surface member and said central upward projecting member are generally uniform and equal.

14. The combination as set forth in claim 13 wherein said central upward projecting portion includes a top surface having a suitable depression for mating with a screwdriver or the like.

* * * * *